(12) United States Patent
Uppiano et al.

(10) Patent No.: US 6,638,315 B2
(45) Date of Patent: Oct. 28, 2003

(54) METHOD FOR PRESERVING THE STATE OF A JAVA APPLET DURING THE LIFETIME OF ITS CONTAINER

(75) Inventors: Karl A. Uppiano, Ferndale, WA (US); Vaughn H. Wine, Bellingham, WA (US); Joseph C. Younger, Lynden, WA (US)

(73) Assignee: Wall Data Incorporated, Kirkland, WA (US)

( * ) Notice: Subject to any disclaimer, the term of this patent is extended or adjusted under 35 U.S.C. 154(b) by 0 days.

(21) Appl. No.: 09/157,790

(22) Filed: Sep. 21, 1998

(65) Prior Publication Data

US 2002/0152232 A1 Oct. 17, 2002

(51) Int. Cl.[7] .................................................. G06F 7/00
(52) U.S. Cl. ........................ 715/513; 707/206; 717/118
(58) Field of Search .............................. 707/501.1, 513, 707/206; 717/118

(56) References Cited

U.S. PATENT DOCUMENTS

| | | | | |
|---|---|---|---|---|
| 5,742,768 A | * | 4/1998 | Gennaro et al. .................... 1/1 |
| 5,761,499 A | * | 6/1998 | Sonderegger ................. 707/10 |
| 5,835,914 A | * | 11/1998 | Brim ........................... 707/206 |
| 5,919,247 A | * | 7/1999 | Van Hoff et al. ............ 707/201 |
| 5,987,242 A | * | 11/1999 | Bentley ......................... 703/13 |
| 6,125,402 A | * | 9/2000 | Nagarajayya et al. ........ 709/304 |
| 6,128,655 A | * | 10/2000 | Fields et al. ................. 709/219 |
| 6,138,127 A | * | 10/2000 | Pasch ...................... 707/103 Y |
| 6,317,761 B1 | * | 11/2001 | Landsman et al. ............ 705/27 |
| 6,339,782 B1 | * | 1/2002 | Gerard et al. .................. 709/1 |

OTHER PUBLICATIONS

Modular System Building with Java Packages, Jordan et al, IEEE, 1997, pp. 155–163.*
Garbage Collection and Memory Management, Evans et al, ACM SIGPLAN conference on Objec–Oriented programming systems, 1997, pp. 138–143.*

* cited by examiner

Primary Examiner—Stephen S. Hong
Assistant Examiner—Cesar B Paula
(74) Attorney, Agent, or Firm—Christensen O'Connor Johnson Kindness PLLC (57) ABSTRACT

A method of controlling the existence of a Java object associated with a Web page in order to reuse the object, rather than create a new one when the Web page is revisited. The invention provides a method for allowing an object to register with a persistence manager upon creation, which maintains objects registered with it while the Web page is no longer being viewed. A Web browser translates instructions to create a Web page and invokes any Java objects resident on the page. The objects then check with the persistence manager to determine if the objects are present in the persistence manager. The objects in the persistence manager are then used, rather than creating new objects. The object remains registered until such time as it no longer needs to persist or until the Web browser is completely shut down.

10 Claims, 5 Drawing Sheets

METHOD FOR PRESERVING THE STATE OF A JAVA APPLET DURING THE LIFETIME OF ITS CONTAINER

FIELD OF THE INVENTION

The present invention relates to the methods of controlling communication between a client computer and a server computer, and in particular, methods of controlling the creation and destruction of software objects on a web page.

BACKGROUND OF THE INVENTION

In recent years there has been a tremendous proliferation of computers connected to a global network known as the Internet. A client computer connected to the Internet can download digital information from special computers called World Wide Web Servers, or simply Web servers, that are also connected to the Internet. Web browser programs running on the client computers translate the downloaded digital information into a visual form called a "Web page" that is perceptible by a user.

In the past, the content or data contained in a Web page was static and did not change after being displayed in a Web browser program. More recent technology allows the inclusion of program code with the digital information downloaded from Web servers to define software components that execute while a Web page is being viewed with the browser program. The software components provide interactive, dynamic content in Web pages. The components may establish and maintain interactive sessions between a user and remote computers, display animation, or present regularly updated information. Sun Microsystems of Mountain View, Calif., has created a standard programming language and interpreter which is executed and interpreted by the Web browser program. This standard language is referred to as Java and the interpreter is referred to as a Java Virtual Machine (JVM). A Java program which runs in a Web page is referred to as a Java applet. A Java applet is made up of one or more Java objects that provide for the capabilities of the applet. Some Java objects can be considered Java beans or Enterprise Java beans. Java beans and Enterprise Java beans are Java objects that adhere to a specific set of design patterns and rules. If a Java object is a Java bean, it then has more capabilities than a standard Java object within certain development and other environments.

For example, a Stock Ticker Java applet can display current stock prices that are continuously scrolled across a defined area within a Web page that is displayed by a Web browser with an executing JVM. The Stock Ticker Java applet could be made up of two Java objects, one which connects to a stock price information provider (e.g., Nasdaq) and gathers information, and one that would then display this information. If the first object also adhered to the Java bean design patterns and rules, it would be considered a Java bean in addition to being considered a Java object. "Objects" will be used herein to include Java objects, Java applets, Java beans, and Enterprise Java beans.

In addition to displaying static and dynamic information in a Web page, Web browsers and Web servers provide the capability for users to navigate among numerous Web pages along with the capability of returning to a previously viewed Web page. Currently, when a user exits a Web page, the Web browser destroys any and all Java objects contained therein. If the user later returns to a previously viewed Web page, the Web browser must create a new set of Java objects. For objects like the Stock Ticker described above, this is acceptable because a Stock Ticker applet needs to continuously retrieve the latest stock prices and display them, not store old, previously viewed data or preserve the state of data viewed the last time the page was viewed.

In some instances, it is desirable that a Java object preserves a specific state between invocations by the Web browser. For example, a Java object that accesses a host computer preserves a connection with the host and the current host application screen to which the user has navigated. In addition, the Java object preserves any data the user has entered within the host application screen. In the past, Java objects are destroyed when a Web browser exits a Web page by navigating to a different Web page. When a Java applet is destroyed and recreated upon leaving and returning to a Web page, the host connection must be reestablished. The user must then connect to the host, navigate to the appropriate application screen, and reenter any data that was lost.

To eliminate the need to recreate an applet each time a Web page is accessed, it is desirable to provide the ability for a Java object (or a portion thereof), to remain in existence and retain state information when a user leaves a Web page and returns to it. In addition, it is desirable that a Java object retain its link, or correspondence to a particular Web page, and that any reference to the object remain valid or be replaced by an indistinguishable link when a Web browser returns to the page containing the object. It is also desirable to allow the Java object to continue to execute after a user exits from the corresponding Web page.

SUMMARY OF THE INVENTION

The present invention is a method of controlling the existence of a Java object that is associated with a Web page in order to reuse the object rather than create a new one when the Web page is revisited. The invention provides a method for allowing an object to register with a persistence manager upon creation, which maintains objects registered with it while the Web page is no longer being viewed.

A Web browser receives one or more instructions that define a Web page. The browser translates the instructions to create a Web page, and invokes any Java objects that reside on the page. The objects then check with the persistence manager, which can be located on the page or within one or more of the objects. If the objects are present in the persistence manager, the objects in the persistence manager are used, rather than creating new objects. If the objects (or some subset thereof) do not exist within the persistence manager, the necessary objects are created and are registered with the persistence manager. The object remains registered with the persistence manager until such time as it no longer needs to persist (as determined by the users needs, not by the Web page being displayed within the Web browser) or until the Web browser or JVM is completely shut down. Registration with the persistence manager prevents the destruction of the object when the Web browser exits from a Web page.

Registration of and return of objects from the persistence manager is accomplished by use of the persistence carrier. The persistence carrier is a Java object that knows how to interface with the persistence manager and how to preserve the state (and even allow the execution) of the objects.

The object passes a predetermined identifier of the desired persistence carrier to the persistence manager. The persistence manager uses this identifier in its determination of whether the desired object already exists. The persistence manager maintains a collection of persistence carriers organized in a static hash table by this identifier. If the desired object exists, it will be contained within a persistence carrier with the given identifier.

As will be readily appreciated from the foregoing description, the present invention provides the ability to maintain the existence of an object associated with a Web page beyond the period of the visit to the Web page. When the Web browser exits the Web page and revisits the page, the object has not been destroyed. The object identifier provides a mechanism to link the object with the specific instruction to create it, so that when the instruction is executed upon revisiting the Web page, a reference to the existing object can be reused. The invention allows a dynamic object to continue executing after exiting from the Web page and upon a revisit to the Web page. In situations where the object maintains a communications session with a host computer, the invention allows the object to continue the communications session without having to reestablish it. The invention also has the advantage that the program code to implement it can accept instructions to either have the object continue beyond exiting from the Web page, or to destroy itself when the Web browser exits the Web page. The instructions can be supplied in the form of HTML instructions in the HTML document (the Web page).

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

As indicated above, the present invention is a method of creating Java applets, Java objects, Java beans and Enterprise Java beans, collectively called "objects" herein, which persist (that is, are not destroyed) when a Web browser exits from a Web page. The objects are reused when the Web browser revisits the Web page. Furthermore, the persisted objects can interact with other computers or the client computer even when the Web browser is not viewing the Web page, as long as the Web page was previously visited during the Web browser session.

Figure 1:
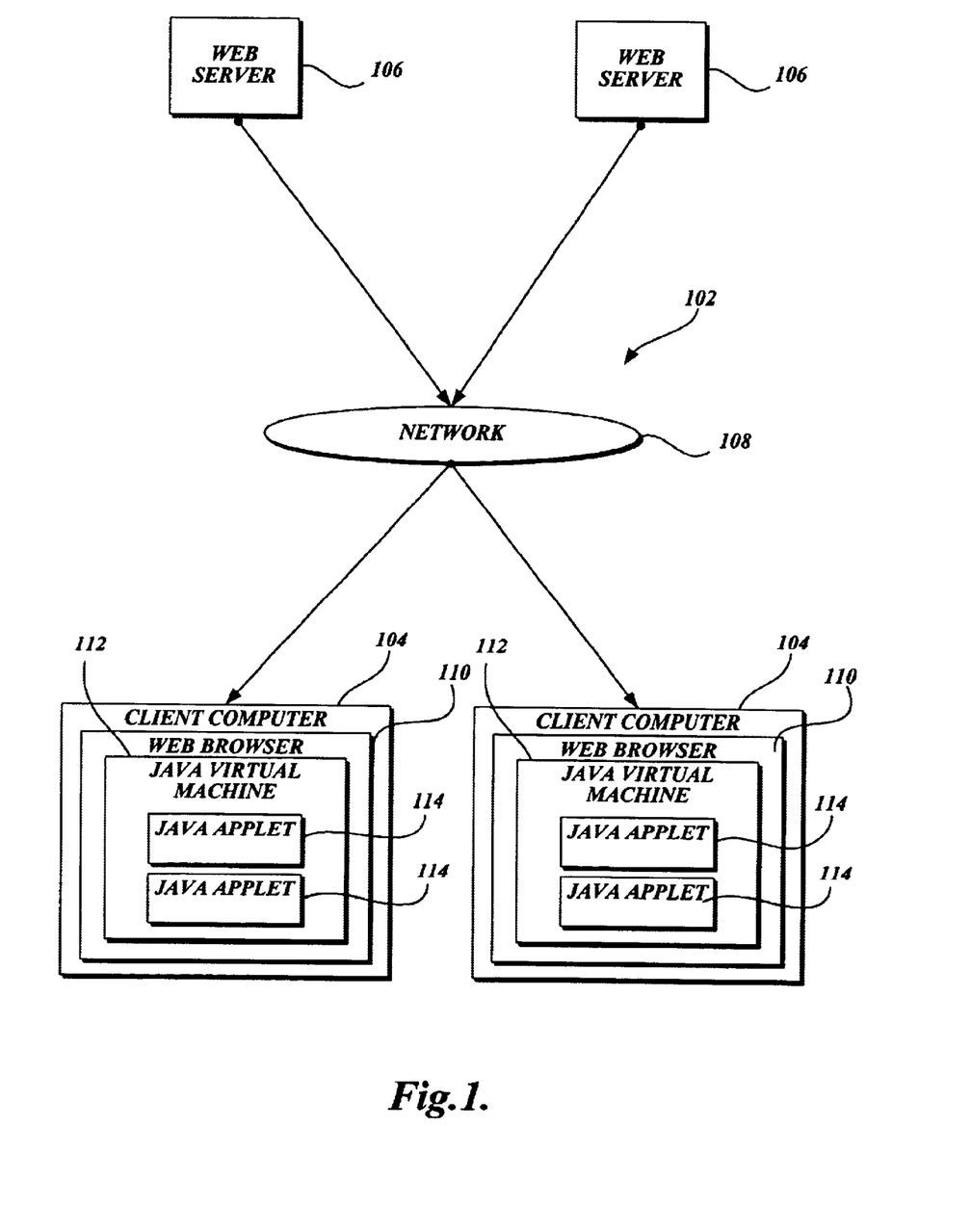
FIGS. 1 and 2 are block diagrams illustrating an exemplary network architecture in which the invention is used.

FIG. 1 illustrates an exemplary network architecture 102 in which one or more client computers 104 communicate with one or more server computers 106 via a network 108 or other communication medium. Each client computer 104 is preferably a computer meant as a workstation for a single simultaneous user that includes an amount of volatile memory. In addition, each client computer 104 includes a processor, a keyboard, a directional input device such as a mouse, and a monitor such as a cathode ray tube (CRT) or a liquid crystal display (LCD). The client computer may or may not have local non-volatile storage such as a hard disk or other data storage device. Programs executed by the computer may use a graphical user interface that is displayed on the monitor. Examples of a graphical user interface include the Windows 95 operating system produced by Microsoft Corporation or the OSF Motif windowing system standardized upon by the OSF Foundation.

The server computer 106 is preferably a computer having the elements of the client computer 104 as described above with the exception that it must have at least one local non-volatile storage device. The server computer 106 is usually optimized for more than one simultaneous user. The client computer 104 and the server computer 106 communicate with each other via the network 108, which could be a wide area network, a local area network, or a TCP/IP connection. In the presently preferred embodiment of the invention, the network is the Internet. The Internet is a commonly used wide area network that comprises many networks linked together to form a global network. The Internet, wide and local area networks, and TCP/IP communication mediums are well understood by those of ordinary skill in the art and need not be discussed in further detail here, except as they relate to the present invention.

Connection of the client and server computers to the Internet is provided in a conventional manner by an Internet service provider. Using the Internet, the server computers 106 are able to communicate with the client computers 104 utilizing a protocol known as Hypertext Transfer Protocol (HTTP). When operated in this manner, the server computers are commonly referred to as World Wide Web servers or simply Web servers 106. When the network is a local area network, it is referred to as an "intranet."

The Web server computers 106 transmit documents over the network to one or more client computers. Each server executes a Web server program (not shown) that receives requests for documents from the client computer, and in response, transmits documents to the client computer 104 over the network 108. In the presently preferred embodiment of the invention, the document is comprised of Hypertext Markup Language (HTML) statements, embedded scripts and embedded objects that together are referred to as an HTML document.

HTML is a mark up language that provides document formatting information along with text. A script is a series of one or more instructions from a programming language that is designed to be embedded within an HTML document. Visual Basic Script, created by the Microsoft Corporation of Redmond, Wash., and JavaScript, created by Sun Microsystems of Mountain View, Calif., are two commonly used scripting languages. A number of Web server programs are commercially available, such as Microsoft's Internet Information Server and the Netscape Communications Server by the Netscape Corporation.

The client computer 104 executes a browser application 110 that communicates with the Web server programs running on the server computers 106 and displays HTML documents received from the server computer. Browser applications that communicate over the Internet and use HTTP are commonly referred to as Web browsers 110. The Web browser application may comprise a single application program, multiple application programs, or a number of software components that work together to implement the functionality of the browser application. For example, a Web browser may comprise a document retrieval component and a separate HTML viewing component, each performing separate tasks of a Web browser. One of these components is a Java Virtual Machine (JVM) 112. The JVM is the component which is responsible for executing Java applets 114, Java objects 116, Java beans and Enterprise Java beans 118 (collectively referred to as "objects") when they are contained within an HTML document. As used in this application, the term "Web browser" refers to a collection of one or more software applications or components that operate to implement all or part of the functionality of a Web browser. Internet Explorer 4.0 by Microsoft Corporation and Netscape Navigator 4.06 by Netscape Communications Corporation are examples of Web browser applications that can be used with the present invention when running on the Windows® 95 or Windows NT® operating systems.

Figure 2:
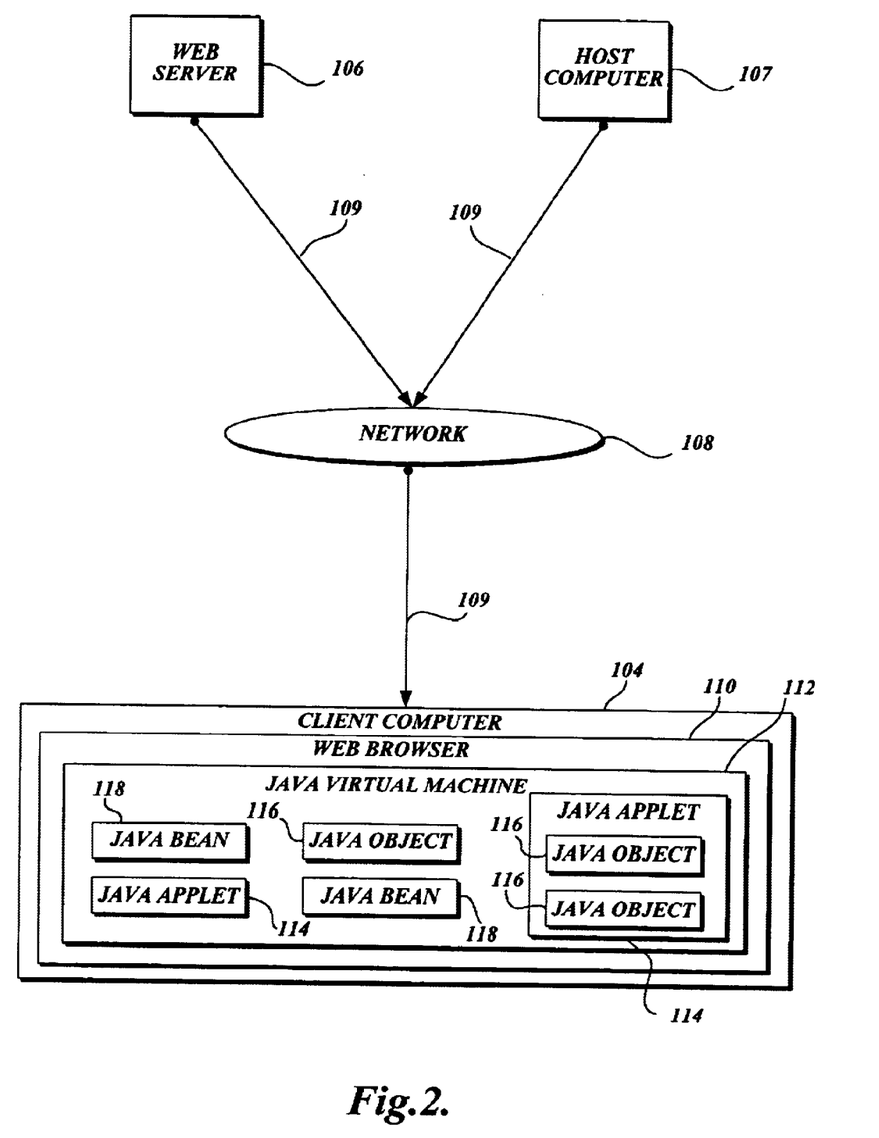

FIG. 2 shows how a host computer 107 may be connected to the Internet so that users of client computers 104 can connect to the host and download Internet Web pages. The host computer 107 is connected to a communications medium 109, either directly or through some gateway, such as an SNA network gateway. The communications medium 109 enables the server computer 106, the host computer 107 and any client computer 104 to exchange commands and data. In such an embodiment, a user operating the Web browser on the client computer 104 communicates with the server computer 106 and requests an HTML document containing, at a minimum, an object 116 which functions to interpret and construct host computer communications consisting of commands and data. Once the object is delivered to the Web browser 110 from the Web server 106, the Web browser invokes the JVM 112 to have it execute the object 116 as described previously. The object then provides a mechanism for a user on the client computer 104 to interact directly with the host 107.

When the HTML document is delivered to the Web browser through the action of the browser's user requesting the document, the local instantiations of the objects 116 are newly created and executed within the JVM 112. There may be one or more objects within any HTML document, some of which may interact with each other or contain other objects in an endless variety. An example of how a collection of objects may relate to each other is depicted in the FIG. 2.

For the duration of the interaction with the host, the object 116 must be able to communicate with the host computer 107. The duration of the communication with the host 107 is often referred to as a host session or just a session. An object which manages a communications session with the host may be referred to as a session object. The process of communication requires a communications link between the object and the host computer. The process of establishing this communications link is often referred to as "connecting" to the host computer 107. The steps of receiving an HTML document, interpreting the HTML statements and displaying a Web page are referred to as "visiting" the Web page.

When the user of the Web browser 110 browses to another Web page, the objects executing within the previously viewed Web page are stopped and become candidates to be "garbage collected" or destroyed. A browser "exits" a Web page when it no longer displays the Web page. Destroying the communications link is referred to as "disconnecting" from the host computer. In a system where the object is repeatedly stopped and destroyed, the object must repeatedly connect to the host computer each time the object is created. By maintaining the existence of the object, repeated connection to the host computer is not necessary.

Some browsers 110 save HTML documents in a portion of memory known as a "cache." When the browser visits a Web page that has previously been visited, the corresponding HTML document may be obtained from the cache instead of from the Web server 106. The Web page preferably contains information that was transmitted by the host computer 107 over the communications medium 109. Any objects 116 contained within the HTML document when it is viewed from either the Web server or from the cache, are created anew each time it is viewed.

Figure 3:
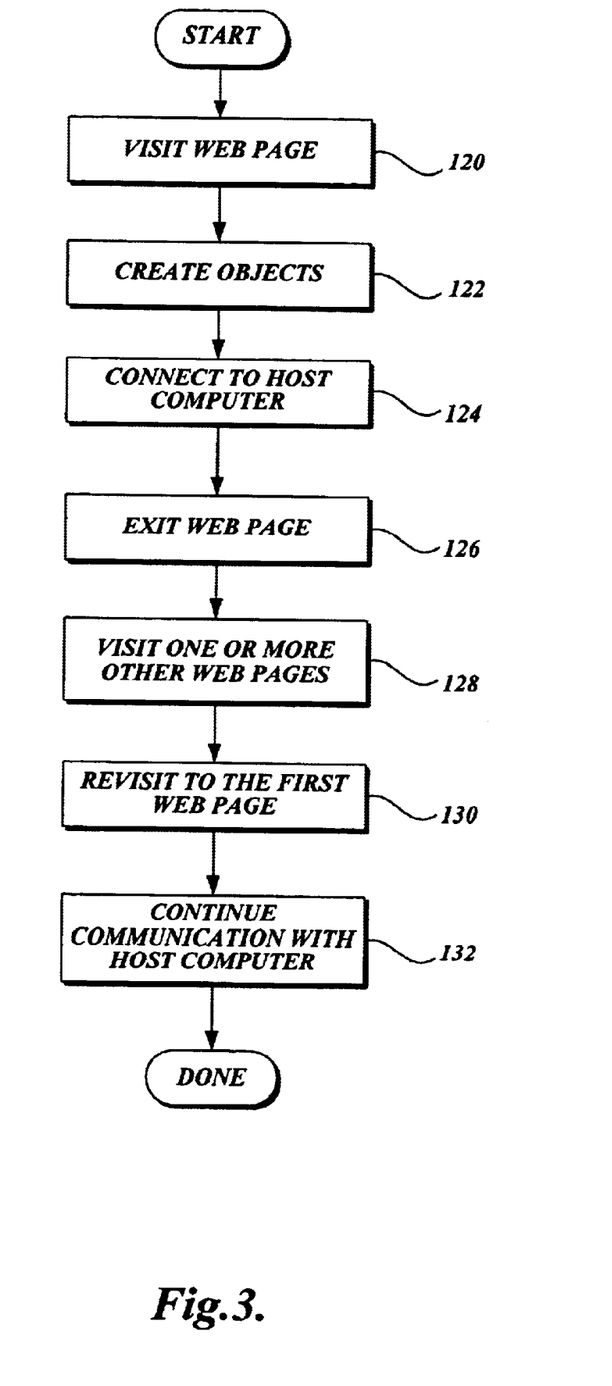
FIG. 3 is a flow diagram illustrating the process of creating and maintaining a connection with a host computer in accordance with the present invention.

As indicated above, the present invention eliminates the need for a Web browser program to recreate the session objects that have been previously created in a Web page. The basic operation of the invention is shown in the flow chart illustrated in FIG. 3. FIG. 3 illustrates a series of steps wherein the present invention is employed. At step 120, the Web browser visits a web page. At step 122, one or more objects are created on the Web page. At step 124, the object that operates to establish a connection with the host computer connects to the host computer. At step 126, the browser exits from the first Web page. At step 128, the browser "visits" a second Web page, performing the necessary actions according to the instructions received in a second HTML document.

Step 128 may comprise visits to multiple Web pages. At step 130, the browser revisits the first Web page, which has the associated instructions for creation of the objects. At step 132, the object continues communication with the host computer.

An important feature in this series of steps lies in the absence of certain steps. Specifically, some of the objects created on the first Web page visit in step 122 employing the present invention are not destroyed between the creation of the objects at step 122 and the continued communication with the host computer at step 132, even though the Web browser exits the first Web page (step 126) and visits other Web pages (step 128) during this interval. There is no disconnecting from the host computer, and there is not a second connecting to the host computer between the step of connecting to the host computer at step 124 and the continued communication with the host computer at step 132. The host computer proceeds with the communication in the same manner as if step 126 of exiting the Web page, step 128 of visiting new Web pages and step 130 of revisiting the first Web page never occurred.

In addition, an object may continue to execute subsequent to step 126 of exiting the first Web page, and during the time period of step 128 of visiting other Web pages and step 130 of revisiting the first Web page. During this period of execution, an object 116 may, for example, continue to receive data from the server computer 106 or from the host computer 107, and send commands over the network 108. An object 116 may process the data or store it at the client computer 104. Other types of processing during this time interval are also possible. For example, an object 116 that receives audio data from the server computer 106 and plays the audio through a speaker connected to the client computer 104 may continue to receive data and play the audio during the time that a user directs the Web browser to visit other Web pages. An object may also be programmed to receive and process data during this time interval and to notify the user when a certain predetermined condition is satisfied.

Figure 4:
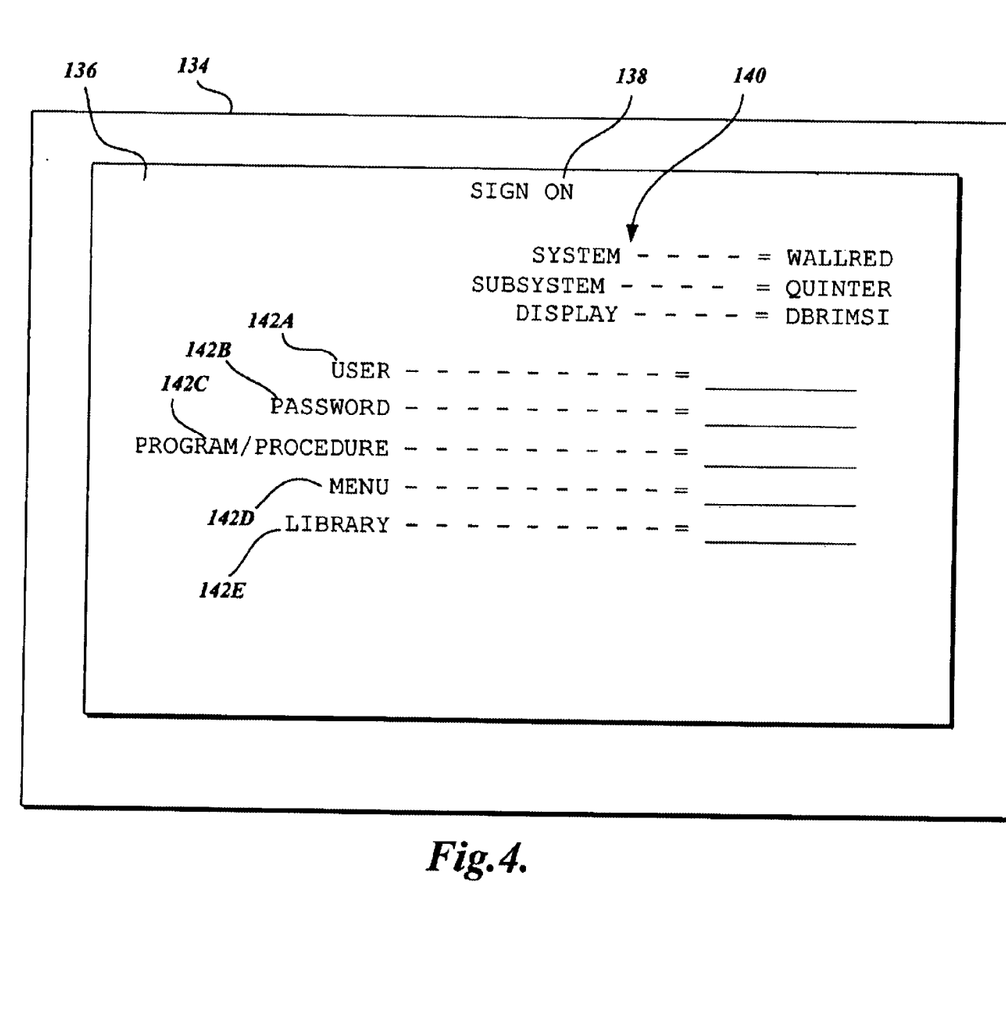
FIG. 4 illustrates an exemplary Web page that contains an object in accordance with the present invention.

FIG. 4 illustrates an exemplary Web page 134 containing an object 136 employing the invention. The depicted object contains text and input fields, the input fields providing a mechanism for a user to enter information. As depicted, the object 116 displays a title 138, and informational text 140. Five labeled input fields 142a–e prompt the user to enter the user's name 142a, password 142b, program name 142c, desired menu 142d, and library name 142e, respectively. Upon receiving the information in the input fields, the object 116 communicates the entered information to a host computer (107 in FIG. 2). The host computer sends new information to the object 116. The object 116 then updates the text contained within it. During a communications session between the object 116 and the host computer 107, the object 116 may update its display many times while the Web browser 110 continues to display the Web page 134.

As discussed above, while the communications link between the object 116 and the host computer 107 is active, a user may command the Web browser to exit the depicted Web page 134 and visit one or more different Web pages (step 128 of FIG. 3). The user may then revisit the depicted Web page 134. By employing the present invention, when the Web browser 110 revisits the depicted Web page, the object 116 does not need to be recreated. Instead, the previously created object is redisplayed, along with the text contained therein when the Web browser exited the Web page 134.

Prior to discussing the components that comprise the invention, a brief summary of the technology used in the preferred embodiment is provided. Commercial Web browsers include a component used to execute Java objects called a Java Virtual Machine (JVM). A JVM can create and execute Java objects of any type, that is, Java applets, Java beans, Enterprise Java beans and any other Java object (collectively referred to as "objects"). Instructions to create objects can be embedded in HTML documents and cause specific objects to be created when the corresponding Web page is displayed in the Web browser. Java objects are explained in more detail in a variety of sources both electronic and in print. One source available is the Javasoft Web site, http://wwwjavasoft.com.

Figure 5:
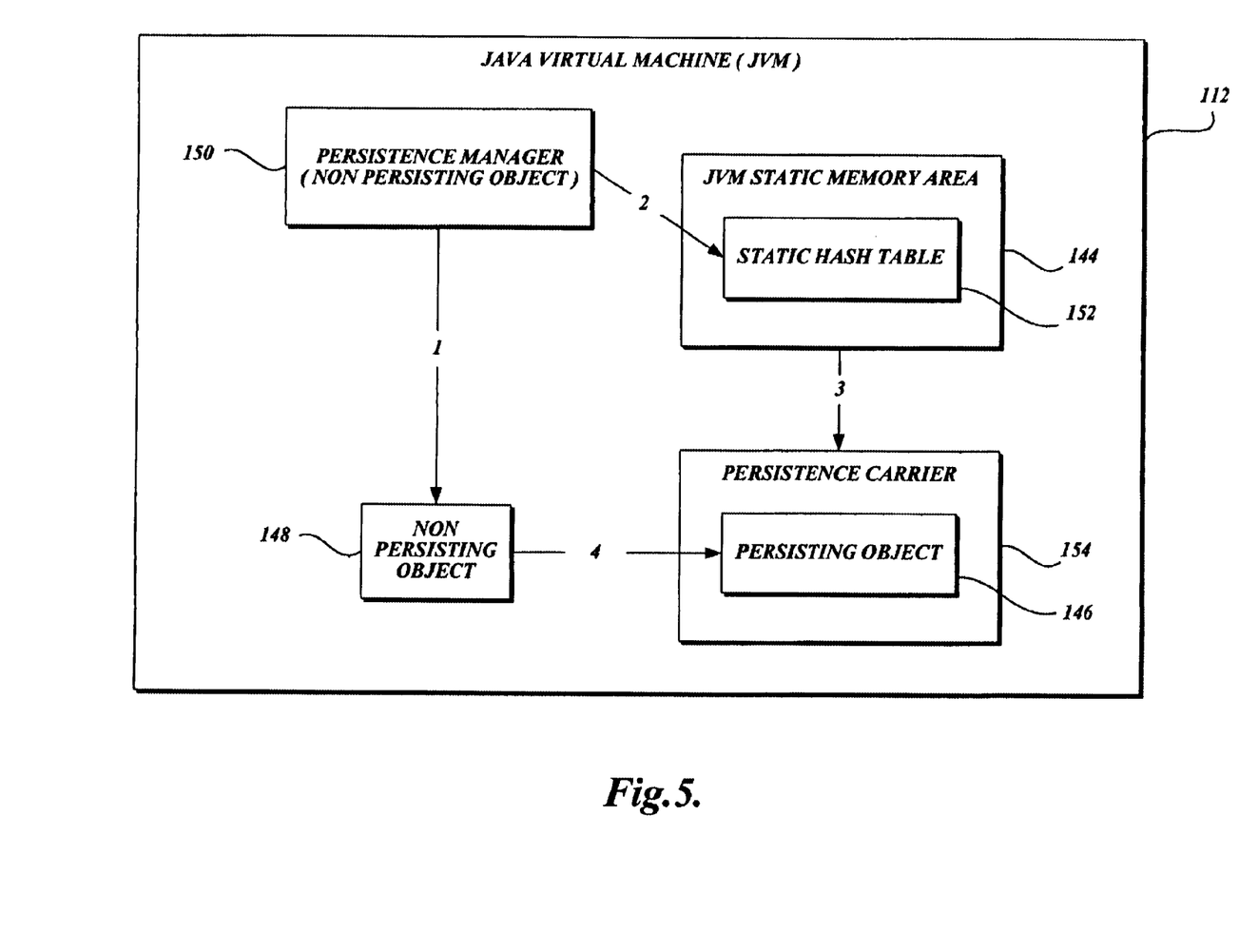
FIG. 5 is a block diagram illustrating an architecture in which the invention is used.

FIG. 5 illustrates the components that comprise the present invention. The JVM 112, a component of the Web browser 110 creates all the components shown within the JVM when the Web browser 110 visits a Web page, with the exception of a JVM static memory area 144. The static memory area 144 is created when the JVM is created by the Web browser. There may be both persisting objects 146, contained in a persistence carrier 154, and non-persisting objects 148. A persistence manager 150 (a non-persisting object) is included and communicates with a static reference mechanism, which is implemented as a static hash table 152 in the preferred embodiment. The static hash table 152 may be a member of (that is, may be contained within) the persistence manager 150, although not shown as such in FIG. 5. A reference to the persistence carrier 154 (a persisting object) is contained within the static hash table 152. It is appreciated that there may be more than one persistence carrier 154. The invention may also be practiced with software objects using other technologies.

Java objects represent computer system elements and contain program code, in the form of "methods" and data. A class defines a certain category or grouping of methods and data to model the behavior of these elements. The methods of a class define the behavior of the object. The data of a class define what information the class is responsible for. An object is a specific instantiation of a class. It is an individual entity, with its behaviors defined by the class. Many objects may be instantiated for a single class. Additionally, a class may be "sub-classed". This sub-classing represents the specialization of a class. For example, a class could be a vehicle. Examples of sub-classes of the vehicle class would be a car class, a motorcycle class, or a skateboard class. A specific object of the car class would be a white 1989 Honda Accord with a particular vehicle identification number. This specific object would also be an instance of the vehicle class. A Harley Davidson would be an instance of the motorcycle class and the vehicle class, but not of the car class. Any program code which expected a vehicle could deal effectively with either the Harley Davidson or the Honda Accord. If the code expected a car, it could not deal with the Harley Davidson, or even more generic vehicle. It could only deal with objects of type car. These are standard principles in object-oriented design, analysis and programming.

In the preferred embodiment, the persistence manager 150 is placed by itself or within another object on the HTML page. When the persistence manager 150 is instantiated, the static hash table 152 is also instantiated. The key here is the static nature of the static hash table. When the data or method of an object is static, there exists exactly one copy for the lifetime of the JVM 112. This means that the static data will not go away during the life of the JVM 112, regardless of the particular Web page being displayed and the particular Java objects being executed. Once the persistence manager 150 has been created, the static hash table 152 will exist until the Web browser application 110 is shut down.

The static hash table 152 holds references to the persistence carrier 154. The persistence carrier object 154 is designed to hold a unique identifier, which is specified on or by the Web page. The persistence carrier class may be sub-classed to hold any type of Java object. In designing an application, the persistence carrier class is sub-classed to hold any application objects which need to persist through the life time of the browser, or at least a portion of that life which is longer than while the Web browser 110 is viewing the Web page. When the object representing the application is created, it requests the persistence carrier 154 from the persistence manager 150 with the unique identifier associated with the Web page. In the case of a host connection application, the objects that connect to the host and process the host data would be persisted, while the objects which display that processed data need not be persisted. Thus, a specific persistence carrier sub-class designed to hold session maintenance objects would be created. This specific type of persistence carrier is the type that an application would expect to be returned from the persistence manager 150 upon the request for the persistence carrier object 154. If the persistence manager 150 returns a persistence carrier 154, then the application object 116 requesting the persistence carrier can treat the returned persistence carrier 154 as the specific type expected for the Web page and get references to the persisting object or objects. If no persistence carrier object 154 was returned from the request, then the requesting object 116 can assume that the Web page was never visited before and create the objects that it wants to persist. It would then create the appropriate type of persistence carrier 154, store the objects 146 in it, and register the newly created persistence carrier 154 with the persistence manager 150. At that point, the application object 116 is free to do whatever it was designed to do.

When the persistence carrier 154 is registered with the persistence manager 150, the persistence manager places the persistence carrier into the static hash table 152. When the application object is completed, such as when the user is finished using a host connection and disconnects, the persistence carrier 154 can be unregistered. When a persistence carrier 154 is unregistered with the persistence manager 150, it is removed from the static hash table 152.

The static hash table 152 keeps a reference to the persistence carrier 154. Since the hash table 152 is a static object, it will remain in existence for the life of the JVM 112. When the Web browser exits a Web Page, all objects are updated as potentially available for garbage collection. This is done by a technique called reference counting, internal to the JVM 112. Whenever an object 116 is created, the JVM has a reference to the object. The HTML document also has a reference to the objects directly on the page. This makes the reference count for an object on the page at least 1, since the reference by the JVM may not count for reference counting purposes. That detail is JVM implementation specific and does not effect the final determination for garbage collection. Once the reference count for an object reaches 0 (or 1 if the JVM reference counts), the object is a candidate to be garbage collected. Once an object is a candidate for garbage collection, a reference to it by any object can never be retrieved again, and eventually, the JVM will destroy the object and release the memory.

Because the static hash table 152 has a reference to the persistence carrier 154, and it, in turn, has references to the persisting application objects 146, the persisting application objects will always have a reference count greater than 0 as long as the static hash table 152 remains in existence. Because the static hash table 152 is a static object, it will remain in existence until the JVM 112 shuts down, which occurs when the Web browser 110 is shut down by the user. Thus, the reference count for the persisting application objects will not be reduced, and they will persist. While the Web browser is visiting other pages, the persisting application objects are free to handle application processing, such as servicing host requests for information, etc.

When the Web browser revisits the Web page, a new persistence manager 150 is created. However, the new persistence manager receives a reference to the already existing static hash table 152, since the hash table is a static data member of the class and only one exists for all persistence managers 150 ever created during the life of the Web browser application 110. Thus, when the non-persisting application object requests the persistence carrier for the Web page, the persistence manager 150 will be able to retrieve it from the static hash table 152.

The embodiments of the invention in which an exclusive property or privilege is claimed are defined as follows:

1. A method of controlling the creation of a Java object associated with a markup language document that at least partially defines a Web page displayed by a browser when the browser visits the Web page, the browser executing on a client computer connectable to a server computer, the method comprising:

receiving the markup language document that at least partially defines a Web page;

analyzing the markup language document to determine if an instruction to create the Java object is contained therein;

determining whether the Java object exists in a persistence manager object, wherein the persistence manager object is configured into a non-persistence object that is adapted for operation on a Java virtual machine; and if the Java object does not exist in the persistence manager object, creating the Java object and registering the Java object with the persistence manager.

2. The method of claim 1, further comprising:

if the Java object exists in the persistence manager object, returning the Java object from the persistence manager.

3. The method of claim 1, wherein the steps of registering the Java object with the persistence manager or returning the Java object in the persistence manager is accomplished by persistence carriers contained in a static reference mechanism.

4. The method of claim 3, wherein the step of determining whether the Java object exists in the persistence manager comprises:

passing a predetermined identifier of a desired persistence carrier to the persistence manager; and using this predetermined identifier, determining whether the Java object already exists.

5. The method of claim 2, wherein the steps of registering the Java object with the persistence manager or returning the Java object in the persistence manager is accomplished by persistence carriers contained in a static reference mechanism.

6. The method of claim 5, wherein the step of determining whether the Java object exists in the persistence manager comprises:

passing a predetermined identifier of a desired persistence carrier to the persistence manager; and using this predetermined identifier, determining whether the Java object already exists.

7. The method of claim 1, further comprising:

determining if the Java virtual machine is shut down;

if the Java virtual machine is determined to be shutdown, deleting at least one Java object associated with the persistence manager.

8. A method of controlling the creation of a Java object associated with a markup language document that at least partially defines a Web page displayed by a browser when the browser visits the Web page, the browser executing on a client computer connectable to a server computer, the method comprising:

receiving the markup language document that at least partially defines a Web page;

analyzing the markup language document to determine if an instruction to create the Java object is contained therein;

determining whether the Java object exists in a persistence manager object, wherein the persistence manager object is configured into a non-persistence object that is adapted for operation on a Java virtual machine;

if the Java object does not exist in the persistence manager object, creating the Java object and registering the Java object with the persistence manager; and if the Java object exists in the persistence manager object, returning the Java object from the persistence manager, wherein the steps of registering the Java object with the persistence manager or returning the Java object in the persistence manager is accomplished by the use of carriers contained in a static reference mechanism.

9. The method of claim 8, wherein the step of determining whether the Java object exists in the persistence manager comprises:

passing a predetermined identifier of a desired persistence carrier to the persistence manager; and using this predetermined identifier, determining whether the Java object already exists.

10. The method of claim 8, further comprising:

determining if the Java virtual machine is shut down;

if the Java virtual machine is determined to be shutdown, deleting at least one Java object associated with the persistence manager.

* * * * *

UNITED STATES PATENT AND TRADEMARK OFFICE
CERTIFICATE OF CORRECTION

| | |
|---|---|
| PATENT NO. | : 6,638,315 B2 |
| APPLICATION NO. | : 09/157790 |
| DATED | : October 28, 2003 |
| INVENTOR(S) | : K.A. Uppiano et al. |

It is certified that error appears in the above-identified patent and that said Letters Patent is hereby corrected as shown below:

| COLUMN | LINE | ERROR |
|---|---|---|
| (54) Pg. 1, col. 1 | Title | "METHOD FOR PRESERVING THE STATE OF A JAVA APPLET DURING THE LIFETIME OF ITS CONTAINER" should read --METHOD AND SYSTEM FOR CONTROLLING THE CREATION OF JAVA OBJECTS-- |
| Pg. 1, col. 2 | Assistant Examiner | "Cesar B Paula" should read --Cesar B. Paula-- |
| 1 | 1-3 | "METHOD FOR PRESERVING THE STATE OF A JAVA APPLET DURING THE LIFETIME OF ITS CONTAINER" should read --METHOD AND SYSTEM FOR CONTROLLING THE CREATION OF JAVA OBJECTS-- |
| 9 (Claim 1, line 18) | 58 | "persistence manager." should read --persistence manager object.-- |
| 10 (Claim 8, line 18) | 46 | "persistence manager; and" should read --persistence manager object; and-- |

Signed and Sealed this

First Day of May, 2007

JON W. DUDAS
*Director of the United States Patent and Trademark Office*